United States Patent [19]
Griffin, Jr.

[11] 3,858,115
[45] Dec. 31, 1974

[54] INDUCTION VOLTS-SQUARED HOUR METER

[75] Inventor: Auburn K. Griffin, Jr., Sanford, N.C.

[73] Assignee: Westinghouse Electric Corporation, Pittsburgh, Pa.

[22] Filed: Aug. 30, 1973

[21] Appl. No.: 392,911

[52] U.S. Cl. ............................................. 324/137
[51] Int. Cl. ....................................... G01r 11/02
[58] Field of Search ............ 324/137, 138; 335/225 310 172

[56] References Cited
UNITED STATES PATENTS
2,761,999  9/1956  Warrington ..................... 335/225 X
2,819,430  1/1958  Sonnemann ..................... 335/225 X
3,500,199  3/1970  Ramsey ............................... 324/138
3,710,245  1/1973  Clay et al. .......................... 324/138

FOREIGN PATENTS OR APPLICATIONS
511,675  4/1955  Canada .............................. 335/225

Primary Examiner—Alfred E. Smith
Assistant Examiner—Rolf Hille
Attorney, Agent, or Firm—R. W. Smith

[57] ABSTRACT

An induction volts-squared hour meter includes an electromagnetic section having a single coil mounted for inductively driving a rotatable conductive disc. A flux shaping member is disposed to orient the coil flux directed into the disc for rotation at a rate responsive to the square of the voltage applied across the coil.

4 Claims, 4 Drawing Figures

PATENTED DEC 31 1974 3,858,115

INDUCTION VOLTS-SQUARED HOUR METER

BACKGROUND OF THE INVENTION

This invention relates to an induction volts-squared hour meter and more particularly to a volts-squared hour meter utilizing a single voltage electromagnet section of an induction watthour meter.

One general type of induction volts-squared hour meter used principally by electric utility companies includes an appearance and general construction similar to that of a single phase watthour meter. Such meters manufactured by the assignee of this invention and designated as a Type WVD3S or type WVD2B-F are described in publication I.L. 42-100WVD dated August 1969 and available from the Westinghouse Electric Corporation, Meter Division, Raleigh, North Carolina. In the aforementioned volts-squared hours meters, the frame of a single phase induction meter supports a conductive disc which is mounted in a magnetic bearing arrangement, for example, as described in U.S. Pat. No. 3,693,086 assigned to the assignee of this invention and further supports a first voltage electromagnet section in a normally mounted position above the disc. The normal current electromagnet section is removed and a second voltage electromagnet section is mounted beneath the disc so that the magnetic fluxes of each of the voltage electromagnet sections are directed into the conductive disc. A large resistor is connected in series with the voltage coil of one of the electromagnet sections and both coils of the voltage sections are connected in parallel across a pair of power line conductors where it is desired to measure the volts-squared hour quantity. A gear driven register with associated dial pointers are driven by the rotation of the disc shaft and are arranged to provide an indication of the volts-squared hours measured.

The operation of the aforementioned type of volts-squared hour meter is in accordance with the general principles of operation of an induction watthour meter in which the magnetic flux fields from the first and second voltage electromagnet sections produce eddy currents in the conductive disc which in turn react with the magnetic flux fields of the electromagnet sections to drive the disc. This operation produces rotation of the disc at a rate responsive to the square of the voltage across the conductors connected to the meter.

While the aforementioned meter has proven satisfactory in operation, it has been found desirable to simplify its construction and eliminate the high value resistor which is a source of heat and electrical losses. It is further desired to generally provide a highly accurate and reliable volts-squared hour meter having a more efficient operation with reduced losses.

SUMMARY OF THE INVENTION

In accordance with this invention, an induction volts-squared hour meter includes a single electromagnet section for directing magnetic flux for rotating a conductive disc. A flux shaping member is disposed in the path of the magnetic flux to establish a predetermined asymmetrical magnetic flux distribution into the disc. The predetermined flux distribution is effective to produce a torque on the disc responsive to the square of the voltage applied to the electromagnet section.

The electromagnet section includes a coil carried on a laminated core which defines a pole face positioned adjacent one side of the disc. A flux return member magnetically linked with flux return paths of the laminated core includes an expanded tongue extending across the opposite side of the disc. The tongue is positioned in an asymmetrical relationship to the pole face to shape the desired pattern of the flux distribution. A short circuited coil around one of the flux return paths further aids in establishing the desired flux distribution and disc torque.

It is a general feature of this invention to provide an induction volts-squared hour meter having a simpler construction and higher efficiency with operation at reliable accuracy. Another feature of this invention is to provide a volts-squared hour meter having the general construction and mounting features of an induction watthour meter including the voltage coil and laminated core structure of a single phase meter voltage section and further including an expanded flux return tongue and a short circuited coil such that the disc drives a dial register indicating an accumulated volts-squared hour measurement of voltage applied to the voltage winding. Other advantages and features of the present invention will be apparent from the description of the drawings briefly described hereinafter.

DESCRIPTION OF THE PREFERRED EMBODIMENT

Figure 1:
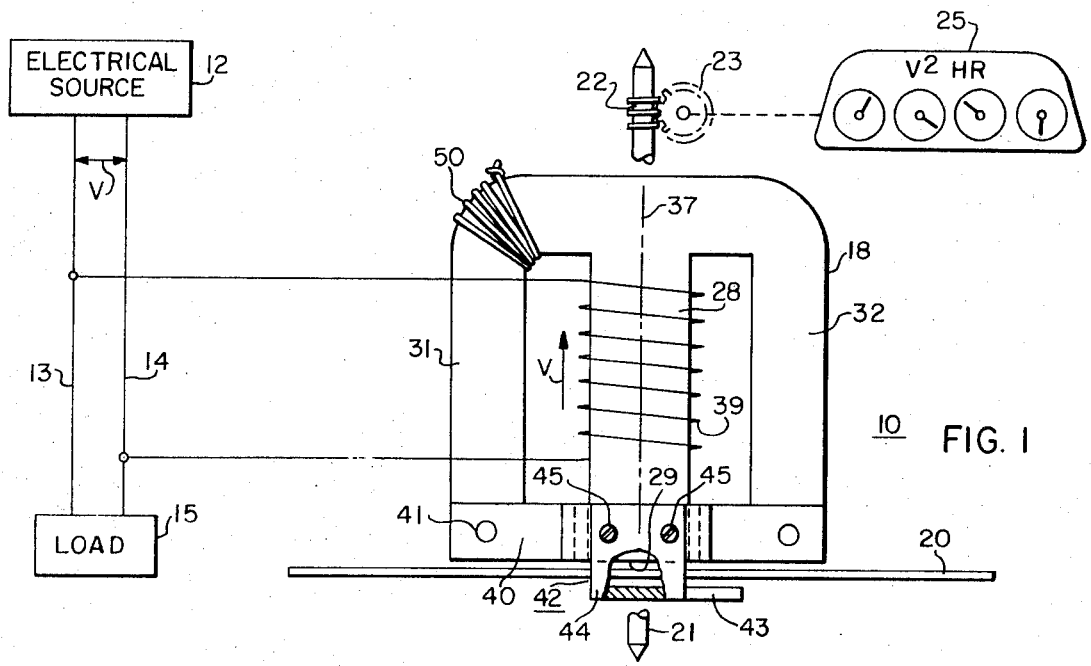
FIG. 1 is a schematic view with parts shown in elevation of an induction volts-squared hour meter embodying the invention.

Referring to the drawing, FIG. 1 shows a volts-squared hour meter 10 made in accordance with the present invention. The meter 10 measures the volts-squared hour quantity applied by an electrical source 12 which develops a voltage V across the power line conductors 13 and 14 connected to a load 15. The circuit including the conductors 13 and 14 is assumed to be operating at a frequency of sixty Hertz and being of the type conventionally supplied by electric utility companies.

The principal parts of the meter 10 include a stator or electromagnet section formed by a modified form of a voltage electromagnet section 18 of a single phase watthour meter. In accordance with this invention, the electromagnet section 18 inductively drives a watthour meter conductive disc 20 carried by a shaft 21 mounted in a frame not shown, also supporting the electromagnet section 18 as described in U.S. Pat. No. 3,693,086 issued to Redecker et al., Sept. 19, 1972 and assigned to the assignee of this invention. The worm 22 and worm wheel 23 couple the shaft rotation to a dial register indicator 25 which is of a type utilized in watthour meters and modified to have pointers indicating the measured volts-squared hour ($V^2Hr$) measured by the meter 10.

The voltage electromagnet section 18 is uniquely provided from a basic structure as provided by the watt-hour meter voltage electromagnet section described and claimed in U.S. Pat. No. 3,493,862 issued Feb. 3, 1970, to Ramsey et al. and U.S. Pat. No. 3,500,199 issued Mar. 10, 1970, to Ramsey, both assigned to the assignee of this invention, which may be referred to for a better understanding of this invention. Accordingly, an E-shaped laminated core of soft magnetic material includes a center leg defining a main pole piece 28 having a lower pole face end 29 for directing a working or main magnetic flux into the disc 20. Outer legs 31 and 32, further defining the laminated core, are connected together at the upper ends to provide flux return pole pieces coupled to the upper or flux return end of the main pole piece 28. The outer legs 31 and 32 include lateral arm extensions 33 and 34, respectively, shown in FIG. 2 which are spaced by flux control air gaps 35 and 36 adjacent the lower end of the pole piece 28. The center and outer pole pieces 28 and 31 and 32 are aligned with each other and over an outer section of the disc 20 so that when a center axis 37 of the pole piece 28 extends perpendicular through a radius axis 38 of the disc 20 the aligned sides of core forming the poles 28, 31 and 32 are at right angles to the radius 38.

A coil 39 disposed on the main pole 28 is of a type utilized in a watthour meter voltage electromagnet section and is preferably of an encapsulated coil construction as described and claimed in U.S. Pat. No. 3,559,134 issued to T. J. Daley Jan. 26, 1971 and assigned to the assignee of this invention. The winding consists of a large number of turns, for example, approximately 2,800 turns, of a small diameter wire.

A bracket 40 made of a soft magnetic material extends between and is secured to the outer legs 31 and 32 by a suitable means such as rivets 41. The bracket 40 provides in one functional aspect as an auxiliary magnetic path in accordance with the bracket arrangements disclosed in the U.S. Pat. No. 3,212,005 issued to J. E. Ramsey Oct. 12, 1965 and the aforementioned U.S. Pat. No. 3,493,862. In the last-named patent the bracket 40 is used on the associated watthour meter voltage electromagnet sections to adjust the phase relationship between the voltage component producing the working magnetic flux and the voltage applied to the associated voltage coil by providing a leakage or shunted magnetic path for a predetermined portion of the main flux developed by the voltage section coil 39. In the aforementioned U.S. Pat. Nos. 3,493,862 and 3,500,199 a bracket similar to the bracket 40 is disclosed having another function by integrally supporting a soft magnetic tongue located intermediate the pole faces of the watthour meter voltage and current electromagnet sections and spaced from the pole face 29 below the disc 20. The tongue disclosed in the aforementioned patents is symmetrical and is centered with respect to the associated voltage pole face to define a more efficient air gap path for the working magnetic flux.

Figure 3:
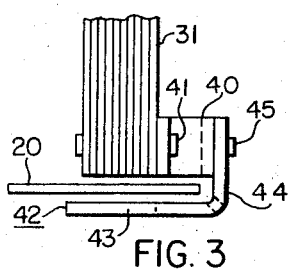
FIG. 3 is a fragmentary side elevation view of FIG. 1.
Figure 2:
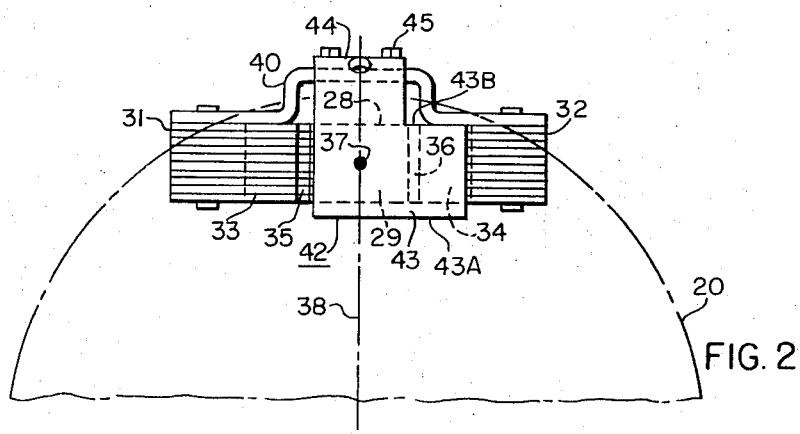
FIG. 2 is a bottom elevation view with parts broken away of FIG. 1.

In the present invention, a flux shaping member 42 is formed by a tongue 43 made of a soft magnetic material such as a magnetic soft steel and extends in a plane parallel to and below the disc 20 as shown in FIG. 3. An air gap space is formed between the pole face 29 and the tongue 43 through which the working magnetic flux passes to drive the disc 20. The tongue 43 substantially covers the pole end 29 and extends toward the outer leg 32 so as to terminate substantially at the juncture of the arm 34 and the leg 32. The tongue is attached by a downwardly extending part 44 to the outer side of the bracket 40 by screws 45. The area of the tongue 43 overlapping the disc in a preferred embodiment defines a substantially rectangular configuration having a dimension in the order of ¾ inch × 1 inch. If preferred, the tongue 43 and part 44 may be made integral with the bracket 40. As seen in FIG. 2, the elongated sides 43A and 43B defining the tongue 43 are substantially parallel to outer sides of the pole pieces 28, 31 and 32 and, therefore, at substantially right angles to the radius axis 38. Thus disposed, the tongue 43 part 44 and bracket 40 define a flux return path for the working magnetic flux passing through the air gap from the pole face 29, through the disc 20, through the tongue 43 and returning to the outer extremities of the bracket 40 and to the outer legs 31 and 32.

It is to be noted that the voltage electromagnet section disclosed in the aforementioned U.S. Pat. No. 3,500,199 includes an adjustable screw arrangement axially movable within a closed secondary tube for adjusting the angle by which magnetic flux is derived from the voltage coil lags the voltage applied to the coil.

A short circuited shading coil 50 is disposed on the attaching end of the outer leg pole piece 31 and in one preferred embodiment includes five turns of 0.072 inch diameter copper wire. The shading coil 50 acts as a short circuit secondary winding and shifts the phase relationship of the magnetic fluxes in the outer return legs 31 and 32. Accordingly, the flux angle relationships of the flux return paths from the tongue 43 and then dividing to pass through the return pole pieces 31 and 32 is arranged so that a different phase angle relationship exists in these two divided paths. The effect is to provide a higher torque due to the adjusted time and space displacement of the magnetic flux flowing through the disc 20. The shading coil 50 is not required when the coil 39 develops a higher magnitude of magnetic flux than the embodiment of the coil 39 described hereinabove. However, the shading coil 50 does afford an addition control feature for adjusting and calibrating the torque developed on the disc 20.

Figure 4:
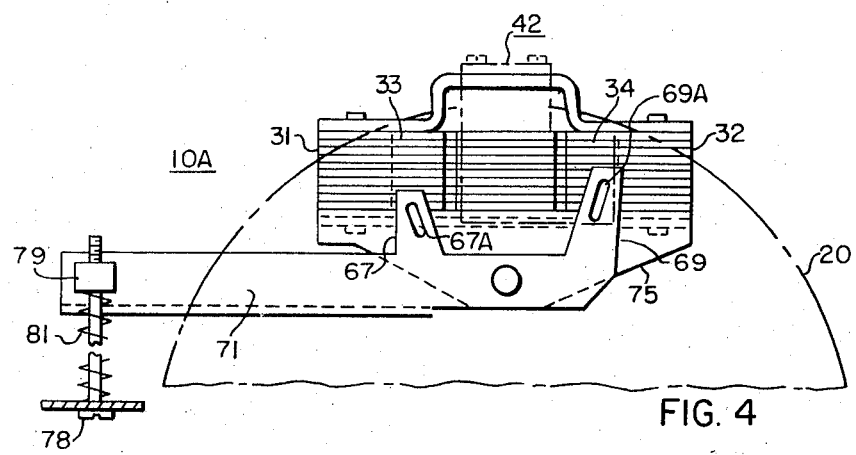
FIG. 4 is a bottom elevation view of an alternative embodiment of the induction volts-squared hour meter illustrated in FIGS. 1 and 2.

In FIG. 4 there is illustrated a bottom view of an alternative embodiment of an induction volts-squared hour meter 10A having the features of the meter 10 shown in FIGS. 1, 2 and 3 and additionally including a disc torque calibration arrangement conveniently provided by the light load calibration arrangement disclosed and claim in the aforementioned U.S. Pat. No. 3,493,862. The elements of the torque calibration arrangement are tabulated hereinbelow with the same numerals designating the same corresponding elements described in the U.S. Pat. No. 3,493,862 which may be referred to for the structural details. The elements are as follows:

| | |
|---|---|
| soft magnetic arms | 67 and 69 |
| arm projections | 67A and 69A |
| lever member | 71 |
| pivot rivet | 73 |
| bracket | 75 |
| adjusting screw | 78 |
| nut | 79 |
| helical spring | 81 |

The arm projections 67A and 69A extend toward and engage the leg extensions 33 and 34 which define the pole faces 13A and 15A disclosed in the U.S. Pat. No. 3,493,863. In accordance with the general operation described in the cited patent, the magnetic flux field directed to the disc 20 is shifted slightly by the movement of the arms 67 and 69. This produces a slight amount of asymmetrical flux distribution to aid in further calibrating the torque developed on the disc 20.

In operation of the meter 10, the main coil 39 is energized by the voltage V appearing across the conductors 13 and 14 so that the main coil flux is principally directed in a working magnetic flux that passes from the pole face end 29 toward the disc 20. In FIG. 2, it is noted that the electromagnet section 18 is mounted adjacent an outer radial area of the disc 20 as is typical for the mounting of watthour meter electromagnet sections. The radius axis 38 extends from the center of the disc 20 through the center of the pole end 29. The asymmetrical shape of the tongue 43 relative to the radius axis 38 and pole center axis 37 as it extends toward the outer leg 32 establishes the desired asymmetrical flux pattern into the disc 20 for the magnetic flux from the pole face 29. The shading coil 46 further produces dissymmetry in the flux passing through the disc 20.

For increasing the amount of working magnetic flux which is directed through the air gap and into the disc 20 and thereby decreasing the amount of the coil main magnetic flux shunted through the control gaps 35 and 36 to the outer leg extensions 33 and 34, the control gaps 35 and 36 are widened slightly from their normal spacing from the center leg 28. For example, the normal spacing of 0.027 inch is widened to 0.035 inch in one embodiment by spreading apart the outer legs 31 and 32 when it is mounted on the frame of the meter 10.

The asymmetrical distribution in the magnetic flux applied to the disc 20 sets up a dissymmetry in the eddy current fields in the disc 20. The eddy currents in turn have associated magnetic fields that react with the working magnetic flux from the pole 28 such that the disc 20 is rotated rather precisely at a rate which is a function of the square of the voltage applied across the winding 38.

While it is known, for example, as disclosed in the aforementioned U.S. Pat. No. 3,493,862 to provide a light-load adjuster in the air gap between the voltage electromagnet section and the disc to produce a slight creep torque on the disc of a watthour meter under light-load conditions, the subject invention substantially departs from this in that the full working magnetic flux passing through the disc 20 is shaped or pulled in an asymmetrical distribution or pattern to effect the total inductive driving torque of the disc 20. Further, the light-load adjuster acts to provide a very slight torque producing effect by altering the dissymmetry between the auxiliary torques described in the aforementioned patent. These latter named torques are provided by the combined cooperative relationship of the fluxes from a voltage electromagnet section and a current electromagnet section being in a predetermined time and phase relationship. The torque calibration or adjusting feature shown in FIG. 4 acts to adjust the magnetic flux field asymmetrical distribution generated by the single coil 39 and established by the flux shaping member 42. This aids in producing more linear torque characteristics related to the input voltage V.

Accordingly, the novel volt-squared hour meter of this invention utilizes only a single coil electromagnet section for effecting rotation of the conductive disc 20 at an accurate reliable rate dependent upon the square of the voltage applied to the single winding of the electromagnet section.

It is contemplated that various changes and modifications may be made without departing from the spirit and scope of my invention.

I claim:

1. An induction volts-squared hour meter comprising: a rotatable conductive disc; an E-shaped laminated magnetic core with a center leg defining a main pole and two outer legs defining flux return poles, said center terminating at a pole face end and said outer legs terminating at free ends adjacent an outer part of said conductive disc and being aligned with each other at a substantially right angle to a radius of said disc; a coil on said center leg, said coil developing a working magnetic flux directed from said pole face end of said center leg through said conductive disc in response to a voltage to be measured applied to said coil; a soft magnetic bracket attached to said two outer legs in a magnetic flux conducting relationship; a soft magnetic flux shaping member extending from said bracket and terminating in an elongated shaped tongue, said tongue extending below both said center leg and said conductive disc with the elongated sides thereof extending at substantially right angles to said radius of the disc for a distance further from the center of the center leg in one direction than in an opposite direction so as to overlap substantially more of the free end of one than of the other of said outer legs and form a predetermined asymmetrical distribution of the working flux field relative to the center leg when being directed through said disc to said tongue; and a dial register rotatably coupled to said disc to indicate a total of disc revolutions representing a corresponding value of volts-square hours measured for the voltage applied to said coil.

2. An induction volts-squared hour meter as claimed in claim 1 wherein the tongue of the flux shaping member has a substantially rectangular shape and extends substantially parallel to the pole face end.

3. An induction volts-squared hour meter as claimed in claim 1 wherein said electromagnet section includes a shading coil formed by a short circuited winding wound on one of the two outer leg flux return poles, said shading coil acting cooperatively with the predetermined asymmetrical flux distribution of said driving flux field so as to maintain the disc rotation at a rate directly responsive to the square of the voltage being applied to said coil.

4. An induction volts-squared hour meter as claimed in claim 1 including a torque adjusting means having first and second movable magnetic arms magnetically coupled to the lower free ends of said outer legs so as to vary the magnetic flux field distribution in said disc upon movement of said magnetic arms.

* * * * *